Figure 1:
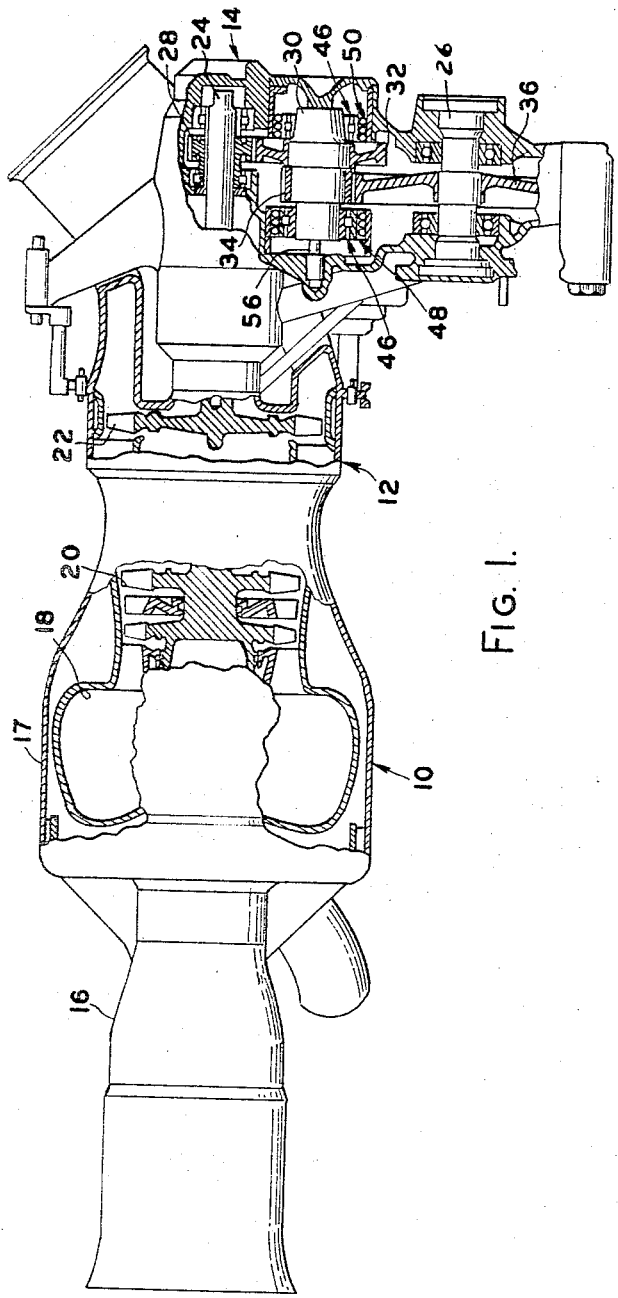

April 11, 1967 E. A. HULBERT 3,313,150
TURBINE ENGINE TORQUE METER

Filed July 6, 1964 3 Sheets-Sheet 1

INVENTOR.
EDWARD A. HULBERT
BY
*Hanke & Hanke*
ATTORNEYS

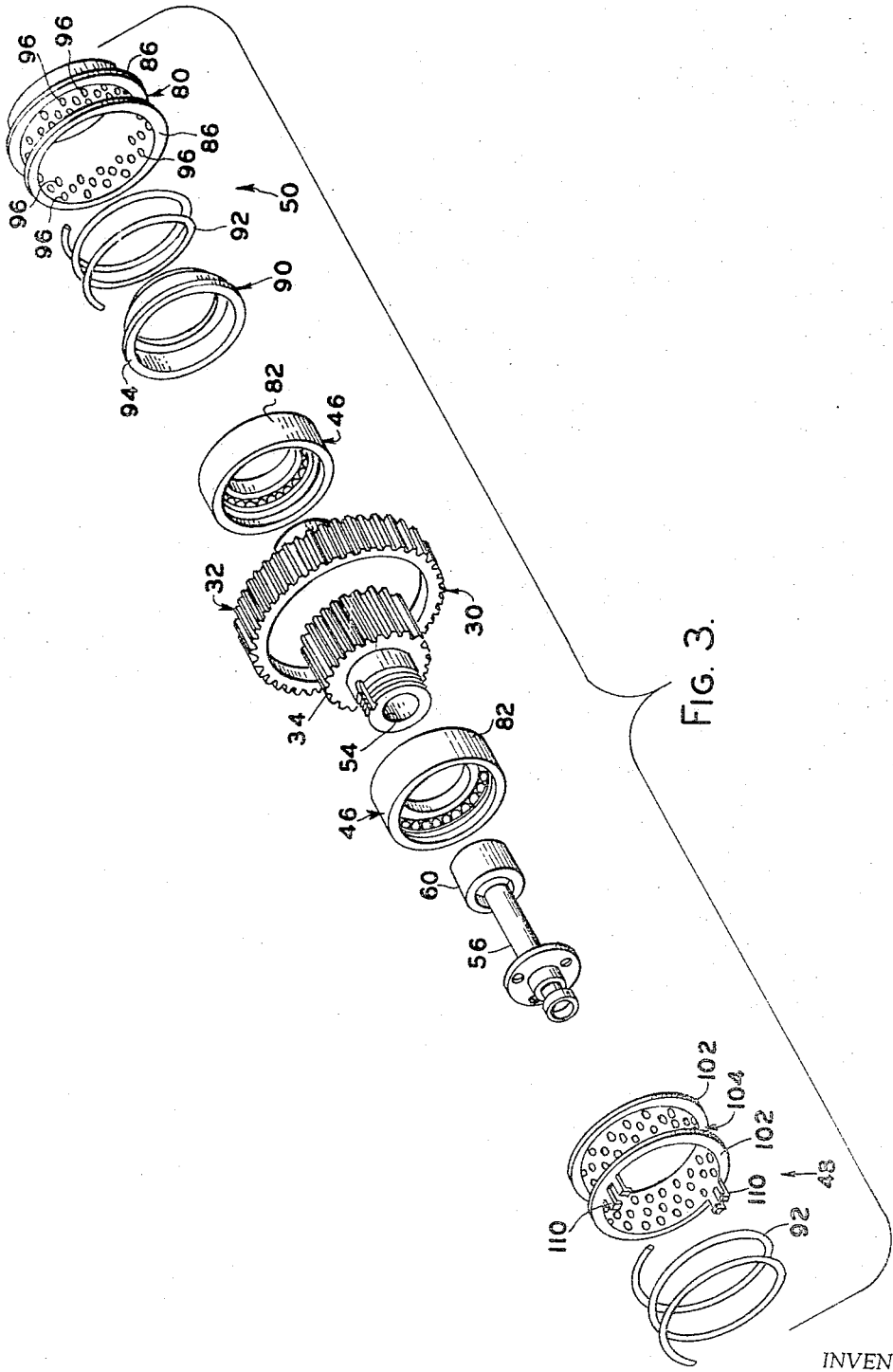

United States Patent Office 3,313,150
Patented Apr. 11, 1967

3,313,150
TURBINE ENGINE TORQUE METER
Edward A. Hulbert, Grosse Pointe, Mich., assignor to Continental Aviation and Engineering Corporation, Detroit, Mich., a corporation of Virginia
Filed July 6, 1964, Ser. No. 380,286
17 Claims. (Cl. 73—136)

The present invention relates to an internal combustion engine particularly to a power transmission means for such engines, and more particularly to an improved means of measuring output torque of such engines.

A commonly used means of measuring the output torque of the various types of internal combustion engines comprises the provision of helical or inclined teeth on one or more pairs of meshing gears of the power transmission assembly to produce an axial load on these gears which is directly proportional to the torque being delivered by the engine. By providing means for measuring the axial load imposed upon the gears an indication of engine output torque can be provided.

One method of measuring such an axial load is to mount the gear to move axially in response to this load and then to sense the axial movement by any suitable means. The problem with known torque meters has been one of achieving accuracy. In heretofore known constructions, the radial load and rotational velocity produced on the gear during operation of the engine substantially increases the friction resisting axial movement of the gear being used to sense engine output torgue so that the axial movement of this gear is not a true indication of the engine output torque. The inherent inaccuracy of such torque meters increases as the radial load and rotational velocity of the gears increase so that over the range of engine operation where it is especially necessary to know engine output torque an accurate indication is not available.

The present invention provides a torque meter which utilizes axial thrust of a gear of the power transmission assembly to measure the engine output torque. The gear is mounted on roller bearings which in turn are supported on their outer races by a ball and ball retainer assembly, thus allowing the gear and roller bearing assembly free axial movement independent of radial load or rotational velocity of the gear. Oil pressure is used to balance the axial thrust of the gear. Since the axial thrust on the gear is directly proportional to engine output torque, the oil pressure required to balance the thrust is proportional to torque and can be measured on a simple pressure gage.

An object then of the present invention is to improve engine instrumentation by providing an improved highly accurate engine output torque meter.

It is another object of the present invention to more accurately indicate the engine output torque of an internal combustion engine by providing a torque meter utilizing the axial thrust on a gear of the power transmission assembly to measure the engine output torque and by providing means allowing the gear free axial movement independent of radial load or rotational velocity of the gear.

It is yet another object of the present invention to improve torque meters of those types in which axial movement of one gear of the power transmission assembly is used to indicate engine output torque by providing an improved means of mounting the gear comprising roller bearings rotatably supporting the gear and which in turn are supported on their outer races by a new ball and ball retainer assembly.

Figure 4:
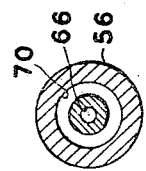
Figure 2:
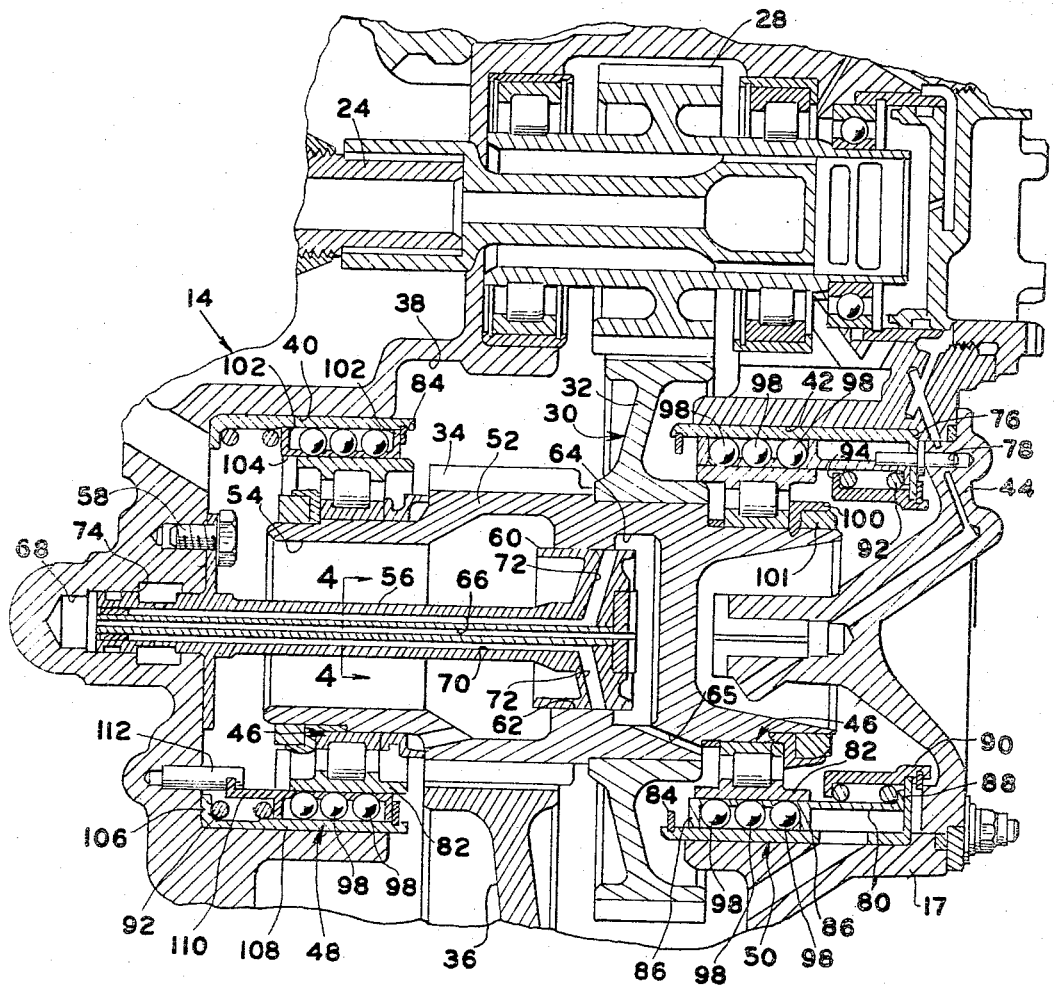

Still further objects and advantages of the present invention will readily occur to one skilled in the art to which the invention pertains upon reference to the following drawings in which like reference characters refer to like parts throughout the several views and in which FIG. 1 is a side elevational view of a preferred turbine engine construction utilizing the torque meter of the present invention and with portions broken away and other portions shown in sections for purposes of clarity, FIG. 2 is a fragmentary cross sectional view of the construction illustrated in FIG. 1 but enlarged somewhat for purposes of clarity, FIG. 3 is an exploded perspective view of portions of the construction illustrated in FIGS. 1 and 2, and FIG. 4 is a fragmentary cross-sectional view taken substantially at line 4—4 of FIG. 2.

Description

Now referring to the drawings for a more detailed description of the present invention, FIG. 1 illustrates a free turbine engine comprising a gasifier section generally indicated at 10, a power turbine section indicated generally at 12, and a power transmission assembly generally indicated at 14. The gasifier section 10 comprises a compressor section 16, combustor 18, and turbines 20. The compressor 16 directs compressed air into the toroidal annular combustor 12. The hot gases from the combustor drive the turbines 20 as well as the power turbine 22 of the power turbine section 12. The power turbine 22 is drivingly connected to a drive shaft 24 and the drive shaft 24 is connected through the power transmission assembly 14 to a driven power take-off shaft 26. The entire engine is mounted in a housing structure 17.

Although the engine which has been described is of the type known as a free turbine engine, it will be apparent as the description proceeds that the torque meter of the present invention is not limited to use with such engines and can be used in fact with any type engine or motor having a power transmission assembly and in which it is desired to have some means of indicating output torque.

As can best be seen in FIG. 2, the power transmission assembly 14 preferably comprises a drive gear 28 secured to the drive shaft 24 to be rotatably driven by the power turbine 22. A compound idler gear 30 has a first geared portion 32 meshing with the drive gear 28 and a second geared portion 34 meshing with a driven gear 36.

As is also illustrated in FIG. 2, the engine housing 17 is preferably provided with an elongated recessed portion 38 forming axially spaced support surfaces 40 and 42 to support the compound idler gear 30. A cover 44 closes the recess 38. The idler gear 30 is axially slidably and rotatably mounted on the support surfaces 40 and 42 by means of a pair of axially spaced roller bearing assemblies 46 and a front and a rear ball bearing assembly 48 and 50 respectively in a manner as will be described in greater detail below.

As also illustrated in FIG. 2, the hub portion 52 of the idler gear 30 is provided with an axially extending elongated recess 54. An elongated shaft 56 is secured to the engine housing 17 as by bolts 58 and extends axially into the recess 54. The free end of the shaft 56 is enlarged to form a substantially cylindrical piston portion 60. The hub portion 52 of the idler gear 30 is further provided with an annular radially inwardly disposed surface 62 engaging the outer surface of the piston portion 60. A pressure chamber 64 is formed between the piston portion 60 and the closed end of the recess 54. As can best be seen in FIG. 4, the shaft 56 is provided with an axially extending central passage 66 which provides communication between the pressure chamber 64 and a chamber 68 provided in the housing 17. The chamber 68 is adapted to be connected to a suitable pressure indicating means (not shown). An orifice 65 is provided in the hub portion 52 of the idler gear 30 in communication with the pressure chamber 64.

The shaft 56 as shown best in FIG. 4 is further provided with an annular axially extending passage 70 spaced and separated from the passage 66 and providing communication between a plurality of substantially radially outwardly extending orifices 72 provided in the piston portion 60 and an annular chamber 74 provided in the housing 17. The orifices 72 are preferably axially spaced somewhat as shown. The chamber 74 is adapted to be connected to a fluid pump (not shown) operable to supply fluid to the chamber 74 at a substantially constant pressure.

As can best be seen in FIGS. 2 and 3, the rear ball bearing assembly 50 preferably comprises a substantially cylindrical outer race 76 mounted in the recessed portion 38 and fixed to the cover 44 by a pin 78. A ball retainer member 80 is positioned intermediate the outer race 76 and an outer race 82 of the roller bearing assembly 46 and is free to move axially with respect to these races. The pin 78 prevents the retainer member 80 from rotating. A retainer ring 84 limits forward axial movement of the ball retainer member 80. The ball retainer member 80 is provided with a pair of axially spaced radially outwardly extending flange portions 86 adjacent the forward end thereof and a radially inwardly extending flange portion 88 at the rearward end thereof. A spring retainer 90 is secured to the outer race 76 of the ball bearing assembly 50 in a position concentric to and radially inwardly spaced from the ball retainer 80. A spring 92 is biased between the flange 88 of the ball retainer 80 and a flanged portion 94 of the spring retainer 90 to urge the ball retainer member 80 toward a rearward axial position or toward the right as viewed in FIG. 2.

As can best be seen in FIG. 3, the ball retainer member 80 is provided with a plurality of annularly and axially spaced openings 96 disposed intermediate the flange portions 86. A ball 98 is carried in each of the openings 96 to engage the inner surface of the outer race 76 and the outer surface of the outer race 82. The roller bearing assembly 46 is secured to the hub portion 52 of the idler gear 30 by a nut 101 and a locking device 100.

The front ball bearing assembly 48 is substantially similar in construction to the rear ball bearing assembly 50 except that because an inside-out arrangement is not required for this assembly no spring retainer 90 is needed. Spring 92 is therefore biased between one of the axially spaced flange portions 102 of the ball retainer 104 and an inwardly extending flange portion 106 of the outer race 108 to urge retainer 104 in the rearward axial direction.

The ball retainer 104 is preferably provided with pairs of annularly spaced axially extending tangs 110 which as can best be seen in FIG. 2, engage a notched fixed pin 112 to prevent rotation of the ball retainer 104.

The gearing of the power transmission assembly 14 is designed to impose an axially directed force upon the compound idler gear 30 which is directly proportional to the torque delivered by the engine through the drive shaft 24. To produce this result, it is necessary to provide either the drive gear 28 and the first gear portion 32 of the idler gear 30 or the driven gear 36 and the second gear portion 34 of the idler gear 30 with helical or inclined teeth. The teeth preferably are inclined such that during engine operation an axial force is imposed on the idler gear 30 tending to move the gear 30 axially forward or toward the left as seen in FIG. 2.

The shaft 56 and piston portion 60 are mounted in a stationary position so that upon axial movement of the idler gear 30, the axially spaced orifices 72 are variably opened and closed to the pressure chamber 64. The particular cantilever mounting of the shaft 56 and its elongated relatively slender construction substantially eliminates friction during sliding and relative rotative movement between the piston portion 60 and its engaging surface 62 since it provides a certain amount of yielding by the piston portion 60 to adjust to the surface 62.

During operation of the engine, the axial thrust imposed upon the idler gear 30 tends to move it axially forward or to the left as seen in FIG. 2. With the gear 30 in its normal position, the orifices 72 are closed from communication with the pressure chamber 64. As engine output torque increases and axial forward movement of the idler gear 30 is produced, the orifices 72 are variably opened to introduce oil pressure to the pressure chamber 64 to oppose axial movement of the idler gear 30. The higher the output torque being produced by the engine, the greater the axial thrust imposed on the idler gear 30 so that as engine output torque increases, the idler gear 30 tends to move toward a position in which all of the orifices 72 are fully opened and a maximum oil pressure is present in the chamber 64 to oppose movement of the idler gear 30. The result is that the idler gear 30 tends to seek a position of balance at each value of engine output torque and the pressure in chamber 64 provides an accurate indication of the axial thrust being imposed on the idler gear 30 and thus an accurate indication of engine output torque.

To insure the highest possible degree of accuracy of the torque meter of the present invention, it is essential that the axial movement of the idler gear 30 be a true indication of the engine output torque. Such accuracy is not possible to obtain if the idler gear is mounted in a conventional bearing since the radial load imposed on such bearings as the gear 30 rotates at high velocities produces substantial frictional resistance to axial movement of the gear 30. This is true whether conventional roller or ball bearings are used.

The particular means of the present invention for mounting the idler gear 30 provides free, substantially frictionless axial movement of the idler gear 30, so that such movement is an accurate indication of the axial thrust being imposed upon the gear 30, and therefore is also an accurate indication of engine output torque. The roller bearing assemblies 46 provide for rotation of the gear 30 while the ball bearing assemblies 48 and 50 insure free axial movement thereof.

The balls 98 are retained in a spaced position by the retainers 80 and 104 and are free to roll against the opposed surfaces of the races 76, 108 and 82. The races 76 and 108 are fixed in place and although the outer race 82 of the roller bearing assemblies 46 has a tendency to creep somewhat under radial load, it is essentially stationary so that there is little interference with the rolling action of the balls as the gear 30 moves axially. The springs 92 are relatively weak and are provided to return the ball retainer members 80 and 104 to the no-load position. This insures that as axial thrust is produced on the idler gear 30 there will be sufficient room along the surfaces of the races 76, 108 and 82 for the balls 98 to roll upon since sliding action of the balls 98 would substantially increase friction.

It is apparent from the above description that an extremely accurate torque meter has been provided. In fact it has been found that with the torque meter of the present invention an accuracy of within two percent can be achieved. This result is achieved not only by the particular means utilized to sense the engine output torque but also by the particular mounting means of the present invention which substantially reduces the effects of friction on the moving parts of the sensing means.

It is also apparent that although a single embodiment of the present invention has been described, many changes and modifications can be made therein without departing from the spirit of the invention as expressed by the scope of the appended claims.

I claim:

1. Means for measuring the output torque of a power transmitting means comprising
   (a) a torque transmitting member rotatably driven by the power transmitting means and adapted to assume an axial position which is dependent upon the output torque of the power transmitting means,
- (b) a first bearing means for rotatably supporting said torque transmitting member, and
- (c) a second bearing means mounting said first bearing means for axial movement of said torque transmitting member, said second bearing means comprising a fixed member, an axially movable member and a plurality of balls disposed between and engaging opposed surfaces of said last mentioned members, said movable member and said torque transmitting member being operably connected by said first bearing means to move axially together whereby said balls roll along the surface of said fixed member.

2. The means as defined in claim 1 and including means sensing the axial position of said torque transmitting member.

3. The means as defined in claim 2 and in which said last mentioned means comprises,
- (a) a pressure chamber formed in said torque transmitting member and adapted for connection to a source of fluid pressure, and
- (b) means operable to vary the pressure in said pressure chamber in response to changes in the axial position of said torque transmitting member.

4. In a power transmitting means having a rotatably driven gear subjected to output torque of the power transmitting means, a means for sensing the output torque of the power transmitting means comprising,
- (a) means translating output torque into an axial thrust on said gear and moving said gear to axial position which is dependent upon the output torque,
- (b) a first bearing means rotatably supporting said gear,
- (c) a second bearing means mounting said first bearing means for axial movement of said gear and being independent of the radial load imposed upon said first bearing means whereby said gear moves axially in response to an increase in the output torque, and
- (d) means sensing axial movement of said gear.

5. In a power transmitting means having a rotatably driven gear subjected to output torque of the power transmitting means, a means for sensing the output torque of the power transmitting means comprising,
- (a) means translating output torque into an axial thrust on said gear and moving said gear to an axial position dependent upon the output torque of the power transmitting means,
- (b) a first bearing means rotatably supporting said gear,
- (c) a second bearing means mounting said first bearing means for axial movement of said gear whereby said gear moves axially in response to an increase in the output torque,
- (d) means sensing axial movement of said gear,
- (e) said second bearing means comprising a fixed substantially cylindrical member having an annular surface, an axially movable substantially cylindrical member spaced from and substantially concentric to said annular surface of said fixed member, said movable member being provided with a plurality of openings, a ball being carried in each of said openings to engage said annular surface of said fixed member, said movable member and said gear being operably connected by said first bearing means to move together, whereby upon axial movement of said movable member said balls roll along said annular surface.

6. The means as defined in claim 5 and in which,
- (a) said first bearing means comprises a bearing assembly having an outer race member,
- (b) said axially movable member of said second bearing means being disposed radially outwardly from and closely adjacent to said outer race member.

7. The means as defined in claim 5 and including biasing means yieldingly resisting axial movement of said movable member.

8. The means as defined in claim 5 and in which said openings are axially and annularly spaced in said movable member.

9. In a power transmitting means having a rotatably driven gear subjected to output torque of the power transmitting means, a means for sensing the output torque of the power transmitting means comprising,
- (a) means translating output torque into an axial thrust on said gear and moving said gear to an axial position dependent upon the output torque of the power transmitting means,
- (b) a first bearing means rotatably supporting said gear,
- (c) a second bearing means mounting said first bearing means for axial movement of said gear whereby said gear moves axially in response to an increase in the output torque,
- (d) means sensing axial movement of said gear,
- (e) said sensing means comprising an axially extending recess provided in said gear and open to one end thereof, a fixed piston member in said recess to form a pressure chamber intermediate said piston member and the closed end of said recess, said piston member being provided with a passage adapted for connection to a source of fluid under pressure, and valve means carried by said piston member and operable to variably open and close communication between said passage and said pressure chamber in response to changes in the axial position of said gear.

10. The means as defined in claim 9 and in which said piston member comprises an elongated axially extending shaft having one end fixed and being formed at the free end with an enlarged portion extending into said recess.

11. The means as defined in claim 9 and in which said piston member is provided with a second passage in registry with said pressure chamber at all axial positions of said gear and adapted for connection to a pressure indicating means.

12. Means for measuring the output torque of a power transmitting means comprising
- (a) a torque transmitting member rotatably driven by the power transmitting means and adapted to move to an axial position dependent upon the output torque of the power transmitting means,
- (b) a first bearing means for rotatably supporting said torque transmitting member, and
- (c) a second bearing means mounting said first bearing means for axial movement of said torque transmitting member and comprising a ball bearing assembly having a fixed member, a plurality of balls and means mounting said balls in spaced relationship and in engagement with said fixed member and said torque transmitting member whereby upon axial movement of said torque transmitting member said balls will roll along the surface of said fixed member.

13. In a power transmitting means having a rotatably driven gear subjected to output torque of the power transmitting means, a means for sensing the output torque of the power transmitting means comprising,
- (a) means translating output torque into an axial thrust on said gear and moving said gear to an axial position which is dependent upon the output torque of said power transmitting means,
- (b) a first bearing means rotatably supporting said gear,
- (c) a second bearing means concentric to said first bearing means and mounting said gear for axial movement of said gear, one of said bearing means being mounted directly to said gear and the other of said bearing means being mounted to said gear through the directly mounted bearing means, whereby said gear moves axially in response to an increase in the output torque, and
- (d) means sensing axial movement of said gear.

14. Means for measuring the output torque of an internal combustion engine comprising,
- (a) a torque transmitting gearshaft driven by the engine and having two gears with at least one of said gears having helical gear teeth to provide an axial thrust on said gearshaft proportional to the output torque of the engine so that said gearshaft will assume an axial position dependent upon the output torque of the engine,
- (b) a pair of bearings for rotatably supported said gearshaft, each of said bearings having a cylindrical outer surface,
- (c) a fixed outer member having an inner cylindrical surface radially outwardly spaced from and substantially concentric with said outer surfaces of said bearings,
- (d) a plurality of balls disposed intermediate and in contact with said surfaces and an axially movable member retaining said balls in axially and annularly spaced positions,
- (e) a yieldable member urging said retainer member in the axial direction opposite the direction of the axial thrust imposed upon said gearshaft whereby upon an increase in axial thrust said gearshaft will move axially in one direction and said balls will roll along said surfaces to move said retainer member in the same axial direction,
- (f) means sensing axial movement of said gearshaft whereby to sense the output torque of said engine.

15. The means as defined in claim 14 and in which said sensing means comprises
- (a) a pressure chamber formed in said gearshaft and adapted for connection to a source of fluid pressure, and
- (b) means operable to vary the pressure in said pressure chamber in response to changes in the axial position of said gearshaft.

16. Means for measuring the output torque of a power transmitting means comprising
- (a) a torque transmitting means rotatably driven by the power transmitting means and adapted to assume an axial position which is dependent upon the output torque of the power transmitting means,
- (b) a first bearing means for rotatably supporting said torque transmitting member,
- (c) a second bearing means mounting said first bearing means for axial movement of said torque transmitting member, said second bearing means comprising a fixed member, an axially movable member and a plurality of balls disposed between and engaging opposed surfaces of said last mentioned members, said movable member and said torque transmitting member being operably connected by said first bearing means to move axially together whereby said balls roll along the surface of said fixed member, and
- (d) means sensing the axial position of said torque transmitting member comprising an axially extending recess formed in said torque transmitting member and open to one end thereof, a piston member fixed in said recess to form a pressure chamber intermediate said piston member and the closed end of said recess, means for supplying a fluid under pressure to said pressure chamber, and means varying the fluid pressure in said pressure chamber in response to changes in the axial position of said torque transmitting member.

17. Means for measuring the output torque of a power transmitting means comprising
- (a) a torque transmitting member rotatably driven by the power transmitting means and adapted to be moved to an axial position which is dependent upon the output torque of the power transmitting means,
- (b) a first bearing means for rotatably supporting said torque transmitting member, and
- (c) a second bearing means mounting said first bearing means for axial movement of said torque transmitting member and comprising a ball bearing assembly having a fixed member, a plurality of balls, means mounting said balls in spaced relationship and in engagement with said fixed member and said torque transmitting member, and biasing means yieldingly resisting movement of said balls in one axial direction along said fixed member whereby upon axial movement of said torque transmitting member said balls will roll along the surface of said fixed member.

References Cited by the Examiner

UNITED STATES PATENTS

| 954,077 | 2/1909 | Clement | 73—140 |
|---|---|---|---|
| 2,578,474 | 12/1951 | Haworth et al. | 73—136 |
| 2,783,645 | 3/1957 | Hornbostel | 73—136 |

FOREIGN PATENTS 247,133  3/1963  Australia.

RICHARD C. QUEISSER, *Primary Examiner.*

C. A. RUEHL, *Assistant Examiner.*